United States Patent
Huang et al.

(10) Patent No.: US 11,438,801 B2
(45) Date of Patent: *Sep. 6, 2022

(54) TRAFFIC SEPARATION IN A CONTROLLER BASED MULTI-AP NETWORK

(71) Applicant: QUALCOMM Incorporated, San Diego, CA (US)

(72) Inventors: Xiaolong Huang, San Jose, CA (US); Bharat Bhushan, Fremont, CA (US); Brian Michael Buesker, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/032,683

(22) Filed: Sep. 25, 2020

(65) Prior Publication Data
US 2021/0037423 A1 Feb. 4, 2021

Related U.S. Application Data

(63) Continuation of application No. 16/529,561, filed on Aug. 1, 2019, now Pat. No. 10,798,613.

(60) Provisional application No. 62/714,422, filed on Aug. 3, 2018.

(51) Int. Cl.
*H04W 28/10* (2009.01)
*H04W 88/16* (2009.01)

(52) U.S. Cl.
CPC ............ *H04W 28/10* (2013.01); *H04W 88/16* (2013.01)

(58) Field of Classification Search
CPC ..... H04W 56/00; H04W 28/24; H04W 12/06; H04W 24/02; H04W 40/244; H04W 48/20; H04W 40/02; H04W 16/18; H04W 72/0426; H04W 72/1242; H04L 47/2491; H04L 9/321; H04L 9/0861; H04L 63/04; H04L 41/0816; H04L 47/2425; H04L 9/32; H04L 47/2408; H04L 41/0213; H04L 47/14; H04L 63/08; H04L 63/0428; H04L 63/14; H04L 1/18; H04L 27/34; H04L 9/0816; H04L 1/0004; H04L 69/22; H04L 69/18; G06F 8/65
See application file for complete search history.

(56) References Cited

U.S. PATENT DOCUMENTS

| | | | |
|---|---|---|---|
| 2011/0110266 A1* | 5/2011 | Li | H04W 56/00 370/253 |
| 2015/0257188 A1* | 9/2015 | Patil | H04W 4/80 455/41.1 |
| 2015/0295629 A1* | 10/2015 | Xia | H04B 7/0695 370/329 |
| 2016/0050684 A1* | 2/2016 | Ni | H04W 72/1205 370/329 |
| 2018/0310301 A1* | 10/2018 | Amini | H04W 24/02 |
| 2019/0090268 A1* | 3/2019 | Dharmadhikari | H04W 16/14 |
| 2019/0132762 A1* | 5/2019 | Zhu | H04W 24/08 |
| 2020/0045585 A1 | 2/2020 | Huang et al. | |

* cited by examiner

*Primary Examiner* — Jung Liu
(74) *Attorney, Agent, or Firm* — Patterson+ Sheridan, L.L.P.

(57) ABSTRACT

Certain aspects relate to methods and apparatus for traffic separation in a multi AP (MAP) network. In some cases, a MAP Controller may configure sets of SSIDs to a single VLAN ID in a Traffic Separation Policy and distribute the Traffic Separation Policy information to the MAP Agents.

23 Claims, 13 Drawing Sheets

| Field | Length | Value | Description |
|---|---|---|---|
| tlvType | 1 octet | TBD | SSID Traffic Separation Policy TLV. |
| tlvLength | 2 octets | Variable | Number of octets in ensuing field. |
| tlvValue | 1 octet | Variable | Policy basis field<br>0: SSID based SSID Traffic Separation policy, used by the Agent<br>1: IP address based SSID Traffic Separation policy, used by the Gateway<br>2~7: Reserved |
| | | | If Policy basis field indicates SSID based SSID Traffic Separation policy |
| | 4 octets | Variable | SSID |
| | | | If Policy basis field indicates MAC address based SSID Traffic Separation policy |
| | 1 octet | M | Number of IP addresses |
| | 6 octets | Variable | IP address of an Agent or STA that is associated with a SSID |
| | | | The above field repeats M times. |
| | 1 octet | Variable | Network Resource Accessibility Bitmap<br>Bit 0: If set to 1, traffic shall only be forwarded between the Gateway and an Agent.<br>Bit 1: If set to 1, traffic is allowed access to wired network segment.<br>Bit 2~7: Reserved |
| | 2 octets | Variable | VLAN VID: The first 4 bits are set to 0x0 and the remaining 12 bits are set to the first VLAN VID number in this VLAN VID block. |

FIG. 10

TRAFFIC SEPARATION IN A CONTROLLER BASED MULTI-AP NETWORK

CLAIM OF PRIORITY UNDER 35 U.S.C. § 119

This application is a continuation of U.S. application Ser. No. 16/529,561, filed Aug. 1, 2019 which claims benefit of and priority to U.S. Provisional Patent Application Ser. No. 62/714,422, filed Aug. 3, 2018, which are assigned to the assignee hereof and hereby expressly incorporated by reference herein.

FIELD

The present disclosure relates generally to communication systems, and more particularly, to methods and apparatus for traffic separation in multi AP (MAP) networks.

DESCRIPTION OF RELATED ART

In order to address the issue of increasing bandwidth requirements that are demanded for wireless communication systems, different schemes are being developed to allow multiple user terminals to communicate with a single access point (AP) or multiple APs by sharing the channel resources while achieving high data throughputs. Multiple Input Multiple Output (MIMO) technology represents one such approach that has recently emerged as a popular technique for the next generation communication systems.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (such as higher throughput and greater reliability) if the additional dimensionalities created by the multiple transmit and receive antennas are utilized.

In wireless networks with multiple APs and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver station (STA) may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

In a distributed MU-MIMO system, multiple APs may simultaneously serve a plurality of spatially separated STAs by coordinating beamforming by the antennas of the multiple APs. For example, multiple APs may coordinate transmissions to each STA.

As the demand for wireless access continues to increase, there exists a desire for further improvements in wireless technology. Preferably, these improvements should be applicable to other multi-access technologies and the communication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide an apparatus for wireless communication. The apparatus generally includes a processing system configured to assign virtual local area network (VLAN) identifiers (VIDs) to service set identifiers (SSIDs) supported by a multi access point (MAP) network, generate traffic separation policy information for each SSID, including the assigned VID, and at least one interface configured to output the traffic separation policy information to agents in the MAP network for use in separating traffic.

Certain aspects provide an apparatus for wireless communication. The apparatus generally includes at least one interface configured to obtain traffic separation policy information including virtual local area network (VLAN) identifiers (VIDs) assigned to service set identifiers (SSIDs) supported by a multi access point (MAP) network and a processing system configured to forward traffic in the MAP network, based on the VIDs in the traffic separation policy information.

Certain aspects provide an apparatus for wireless communication. The apparatus generally includes at least one interface configured to obtain traffic separation policy information including virtual local area network (VLAN) identifiers (VIDs) assigned to client STAs in a multi access point (MAP) network that belong to service set identifiers (SSIDs) based on IP addresses and MAC address and a processing system configured to map downlink traffic for the client STAs to the VIDs assigned to the SSIDs based on the IP addresses in the traffic separation policy information.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10 illustrates an example SSID Traffic Separation Policy type length value (TLV) format.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
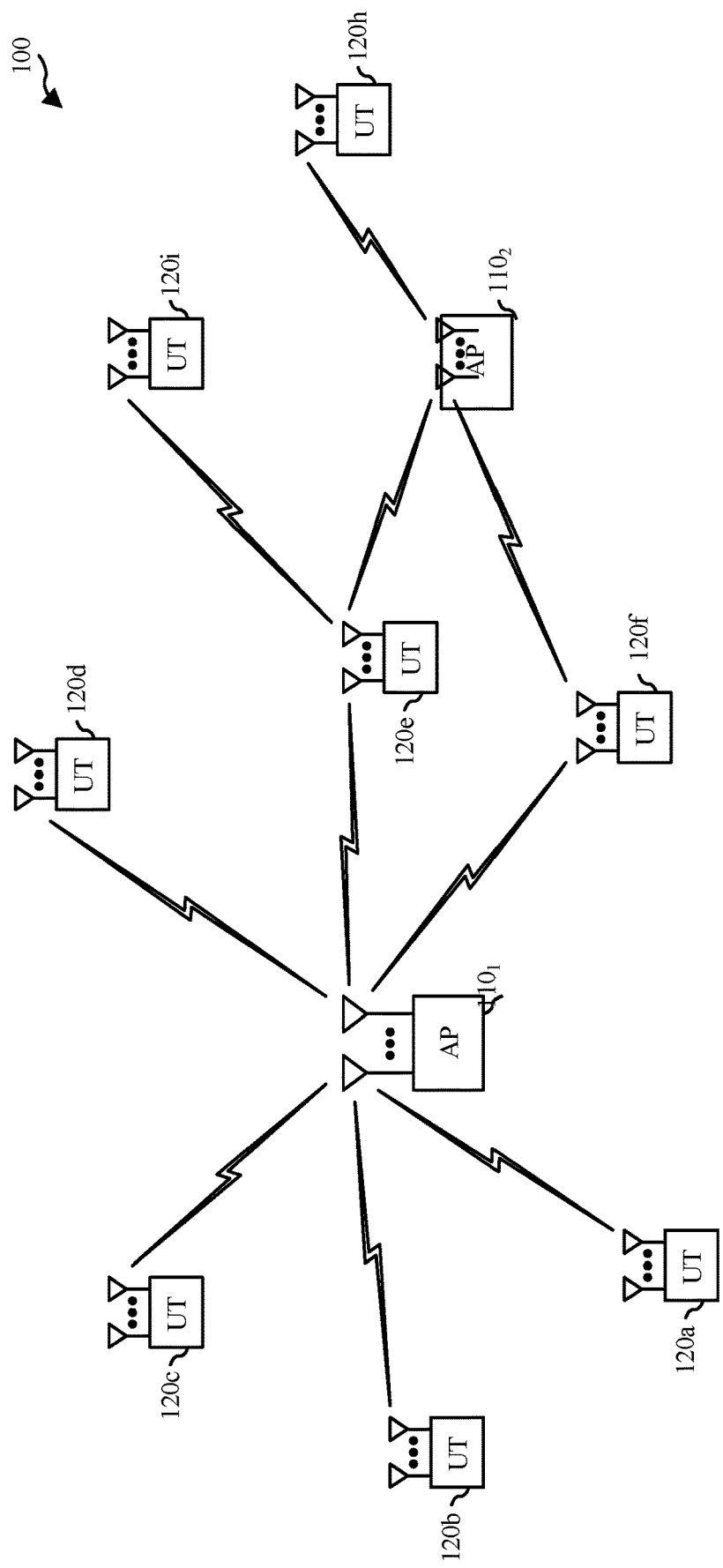
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein may be used for various broadband wireless communication systems, including communication systems that are based on a single carrier transmission. Aspects may be, for example, advantageous to systems employing Ultra-Wide Band (UWB) signals including millimeter-wave signals. However, this disclosure is not intended to be limited to such systems, as other coded signals may benefit from similar advantages.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point or a user terminal.

Multiple APs may transmit to multiple receiving user terminals at a time by using distributed multi-user multiple input multiple output (MU-MIMO). For example, multiple APs may transmit data to a given user terminal at a time, meaning the transmission of data to the user terminal is distributed between the multiple APs. The multiple APs may utilize beamforming to steer signals spatially to the user terminal. In some implementations, for the multiple APs to perform distributed MU-MIMO, the multiple APs coordinate the beamforming performed by each AP to reduce interference for transmitting data to the user terminal. In some implementations, the multiple APs perform a procedure to form a group of APs to transmit to the user terminal, as discussed herein. Further, in some implementations, to coordinate the beamforming between the multiple APs, the multiple APs perform a sounding procedure to gather feedback information from the user terminal about wireless channels between the multiple APs and the user terminal, as discussed herein. The multiple APs may utilize the feedback information to perform beamforming.

Particular implementations of the subject matter described in this disclosure can be implemented to realize one or more of the following potential advantages. For example, APs are able to form a group for transmitting to a user terminal using over the air signaling as opposed to communicating over a backhaul. This may reduce data congestion on the backhaul. Additionally, the sounding procedures may allow for coordinated gathering of feedback information by multiple APs from user terminals. Accordingly, the feedback information for the multiple APs may include channel conditions for each of the multiple APs coordinated in time, which may improve the accuracy of the beamforming based on the feedback information. Furthermore, the sounding procedures may limit the amount of data exchanged wirelessly to perform the sounding procedures, which may reduce bandwidth usage of wireless channels.

EXAMPLE WIRELESS COMMUNICATION SYSTEM

FIG. 1 illustrates a multiple-access point (multi-AP or MAP) network 100 with access points 110 and user terminals 120. For simplicity, only two access points 110 (e.g., APs $110_1$ and $110_2$) are shown in FIG. 1. APs $110_1$ and $110_2$ may coordinate to route traffic between each other and to serve multiple UTs 120, in accordance with techniques described herein.

An access point (AP) is generally a fixed station that communicates with the user terminals and also may be referred to as a base station or some other terminology. A user terminal may be fixed or mobile and also may be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal also may communicate peer-to-peer with another user terminal.

The MAP network 100 employs multiple transmit and multiple receive antennas for data transmission on the downlink and uplink. The access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In some implementations, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., $N_{ut} \geq 1$). The $N_u$ selected user terminals can have the same or different number of antennas.

The MAP network 100 may be a time division duplex (TDD) system or a frequency division duplex (FDD) system. For a TDD system, the downlink and uplink share the same frequency band. For an FDD system, the downlink and uplink use different frequency bands. The MAP network 100 also may utilize a single carrier or multiple carriers for transmission. Each user terminal may be equipped with a single antenna (such as in order to keep costs down) or multiple antennas (such as where the additional cost can be supported). The MAP network 100 may represent a high speed Wireless Local Area Network (WLAN) operating in a 60 GHz band.

Figure 2:
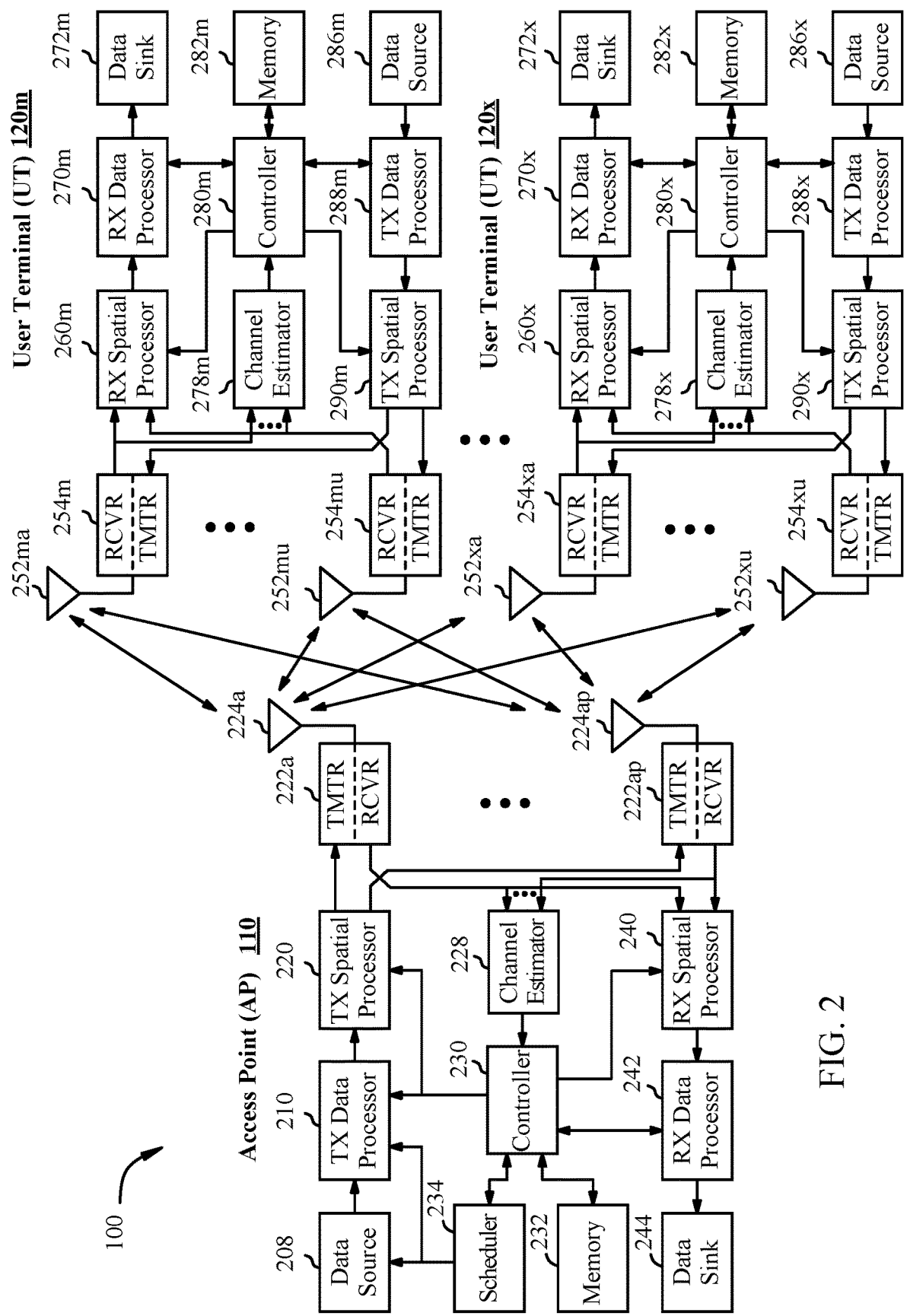
FIG. 2 is a block diagram of an example access point and example stations, in accordance with certain aspects of the present disclosure.

FIG. 2 illustrates example components of the access point 110 and station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 7, 7A, 8, 8A, 15, and 15A.

FIG. 2 shows a block diagram of the access point/base station 110 and two user terminals/user equipments 120m and 120x in a MAP network 100. The access point 110 is equipped with $N_{ap}$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. Moreover, $N_{up}$ may or may not be equal to $N_{dn}$, and $N_{up}$ and $N_{dn}$ may include static values or can change for each scheduling interval. Beamforming (such as beamsteering) or some other spatial processing techniques may be used at the access point and user terminal.

On the uplink, at each user terminal 120 selected for uplink transmission, a TX data processor 288 receive traffic data from a data source 286 and control data from a controller 280. The controller 280 may be coupled with a memory 282. The TX data processor 288 processes (such as encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. The $N_{ut,m}$ transmitter units 254 provide $N_{ut,m}$ uplink signals for transmission from the $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At the access point 110, the $N_{ap}$ antennas 224a through 224$_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the $N_{ap}$ received symbol streams from the $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (such as demodulates, de-interleaves, and decodes) each recovered uplink data symbol stream $\{s_{up,m}\}$ in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals. The decoded data for each STA may be provided to a data sink 272 for storage and/or a controller 280 for further processing.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
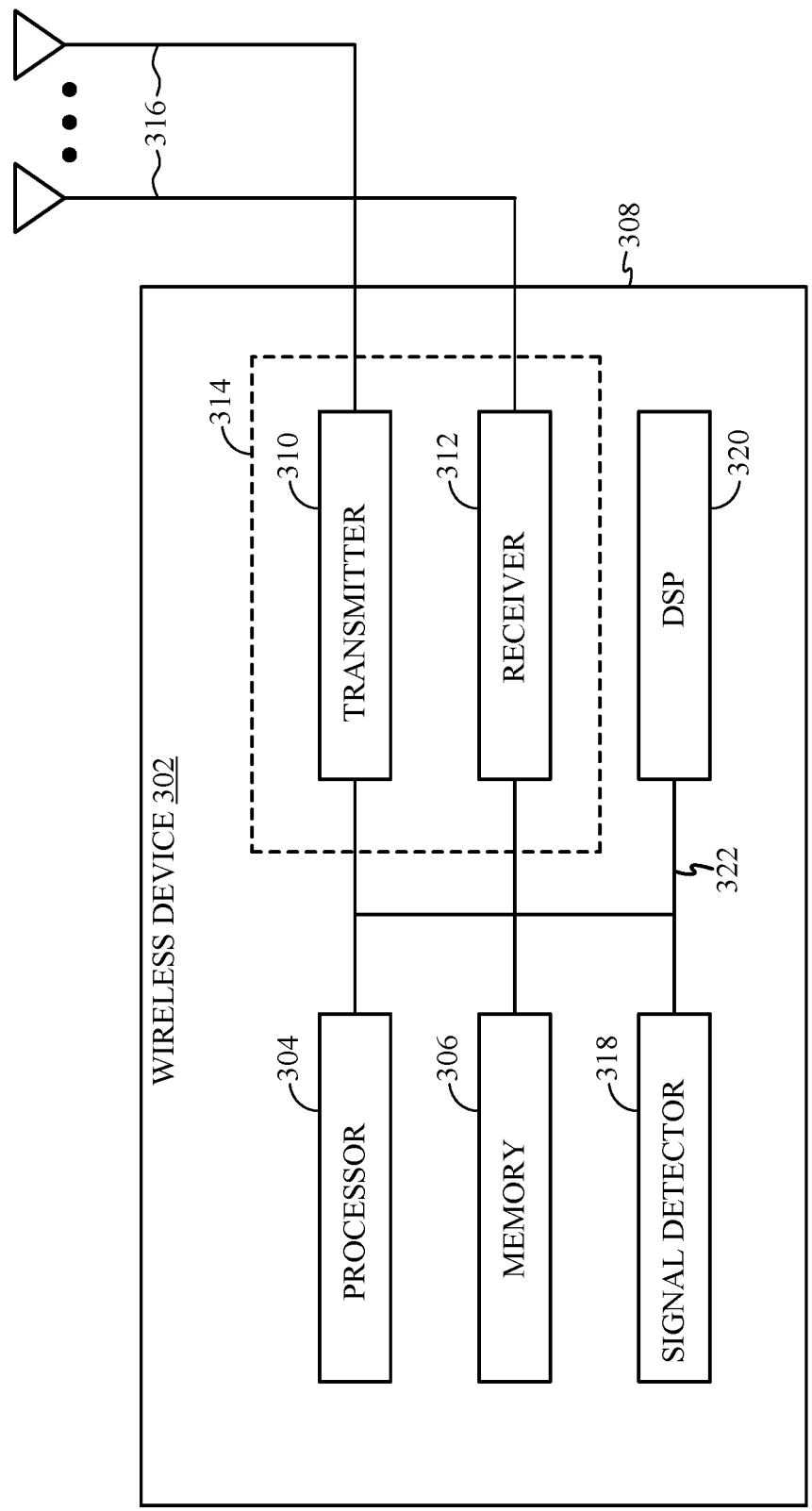
FIG. 3 illustrates an example wireless device, in accordance with certain aspects of the present disclosure.

FIG. 3 illustrates various components that may be utilized in a wireless device 302 that may be employed within the MAP network 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 also may be referred to as a central processing unit (CPU). Memory 306, which may include both read-only memory (ROM) and random access memory (RAM), provides instructions and data to the processor 304. A portion of the memory 306 also may include non-volatile random access memory (NVRAM). The processor 304 typically performs logical and arithmetic operations based on program instructions stored within the memory 306. The instructions in the memory 306 may be executable to implement the methods described herein.

The wireless device 302 also may include a housing 308 that may include a transmitter 310 and a receiver 312 to allow transmission and reception of data between the wireless device 302 and a remote location. The transmitter 310 and the receiver 312 may be combined into a transceiver 314. A plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

EXAMPLE TRAFFIC SEPARATION IN MAP NETWORKS

Aspects of the present disclosure provide techniques that may help achieve traffic separation in multi AP (MAP) networks. For example, the techniques presented herein may allow for separation of traffic to provide different network accesses for clients of a MAP network, such as owner's network, guest network, and public network.

Figure 4:
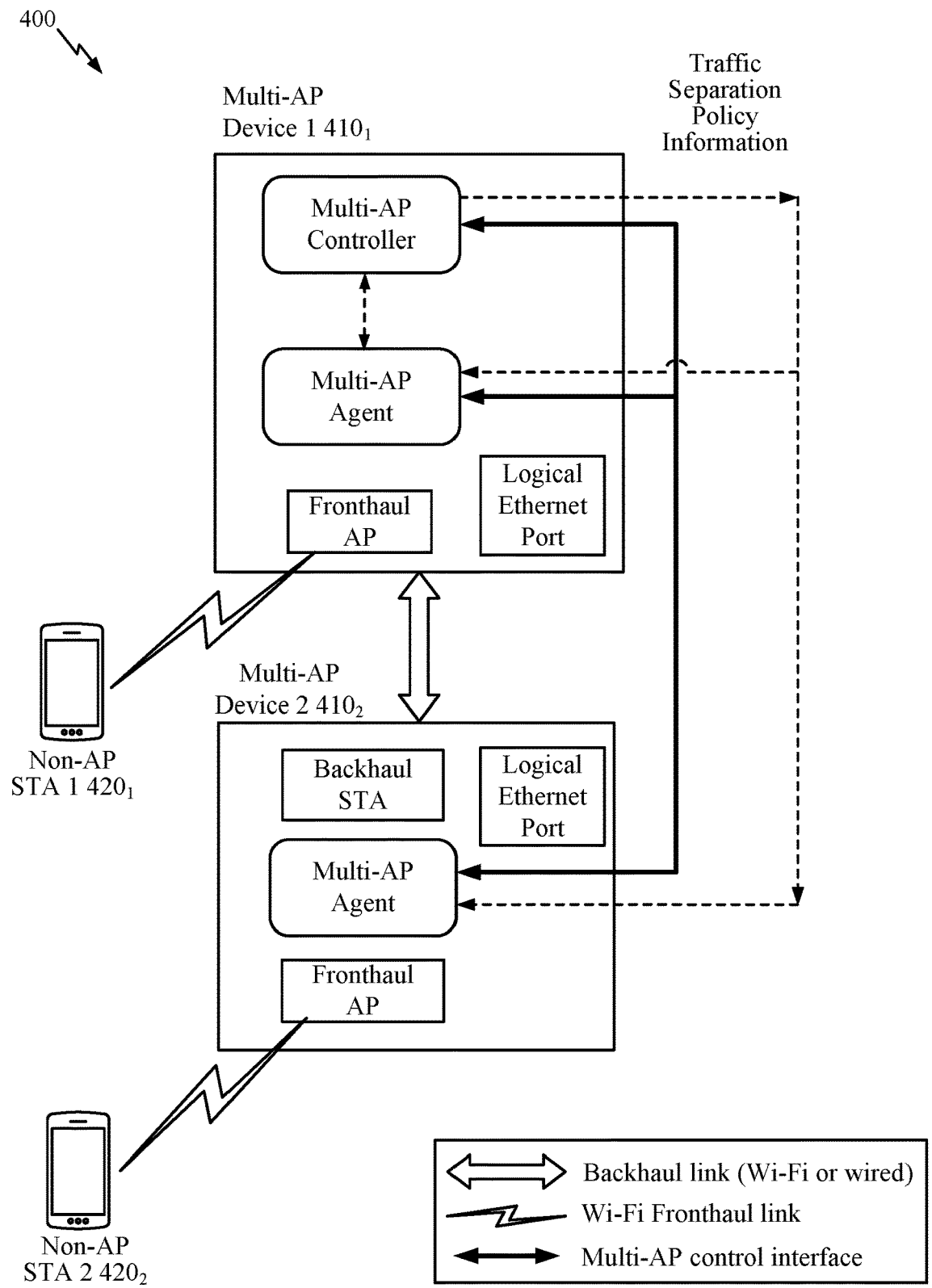
FIG. 4 illustrates a first example diagram of a multi access point (MAP) network, in accordance with certain aspects of the present disclosure.

FIG. 4 illustrates an example MAP network 400 in which MAP devices 410$_1$ and 410$_2$ route traffic to and from non-AP STAs $420_1$ and $420_2$. In this example, MAP devices $410_1$ and $410_2$ communicate directly with non AP STAs $420_1$ and $420_2$ via a wireless fronthaul link, while MAP devices $410_1$ and $410_2$ communicate with each other via a backhaul link that may be wired or wireless.

As illustrated in FIG. 4, the MAP network 400 may be central controller based, for example, with a MAP controller residing on a device within the MAP network (e.g., within a gateway device and/or co-located with a MAP agent). In this example, the MAP controller resides on a MAP device $410_1$. The controller may configure (via a MAP control interface) other devices, referred to as agents, to perform traffic routing as described herein. For example, the controller may generate and send traffic separation policy information to MAP network agents residing on MAP devices $410_1$ and $410_2$, for use in forwarding traffic, in accordance with aspects of the present disclosure.

Figure 5:
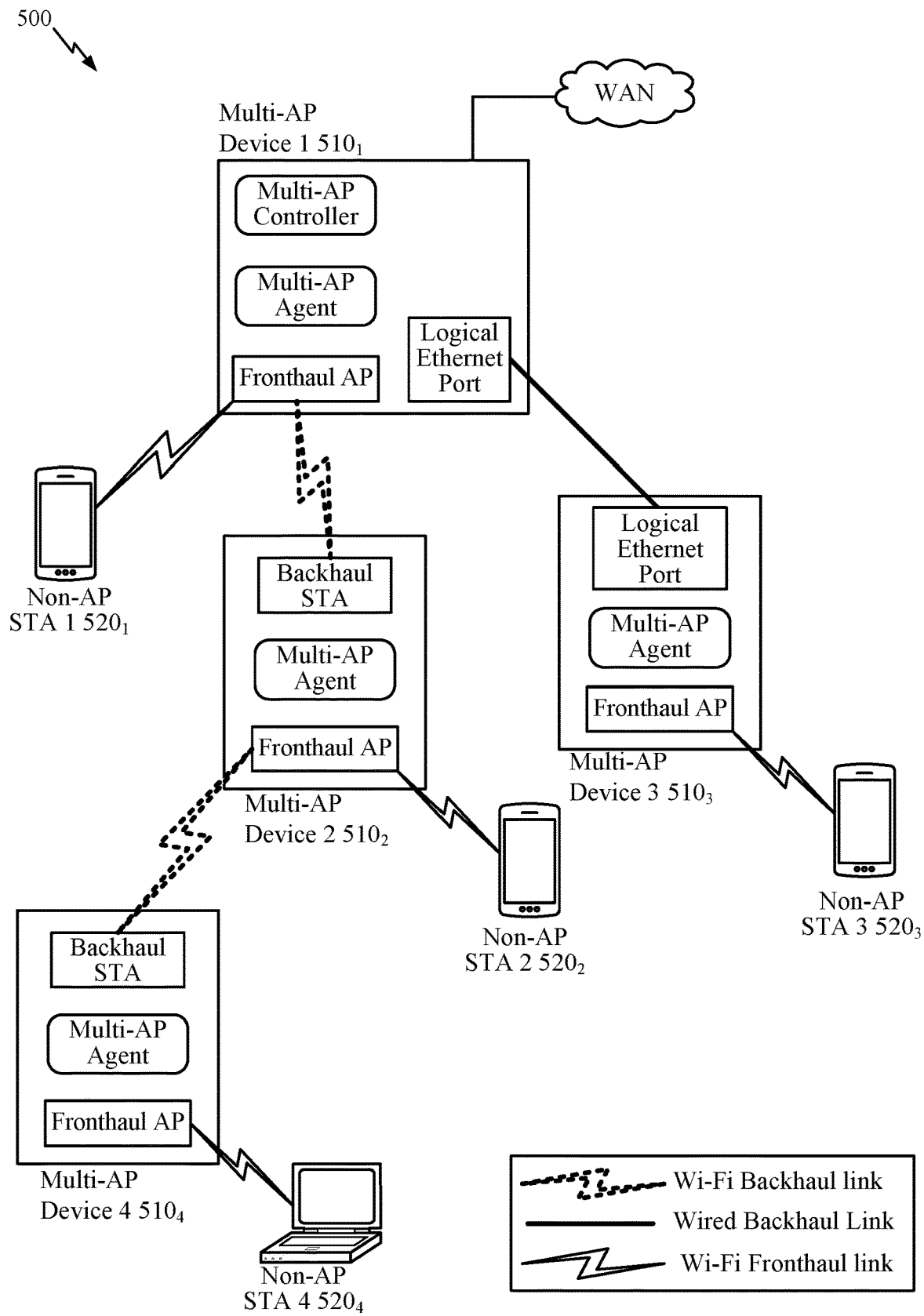
FIG. 5 illustrates a second example diagram of a multi access point (MAP) network, in accordance with certain aspects of the present disclosure.

FIG. 5 illustrates another example MAP network 500 in which MAP devices $510_1$, $510_2$, $510_3$, and $510_4$ route traffic to and from non-AP STAs $520_1$, $520_2$, $520_3$ and $520_4$. In this example, MAP devices $510_{1-4}$ communicate directly with non AP STAs $520_{1-4}$ via a wireless fronthaul link. In this case, MAP devices $510_1$ and $510_2$ communicate with each other via a wireless backhaul link (as do MAP devices $510_2$ and $510_4$), while MAP devices $510_1$ and $510_3$ communicate via a wired backhaul link. As illustrated in FIG. 5, the MAP controller may reside on MAP device $510_1$ which, in this case, may be connected to a wide area network (WAN) and may serve as a gateway device.

Figure 6:
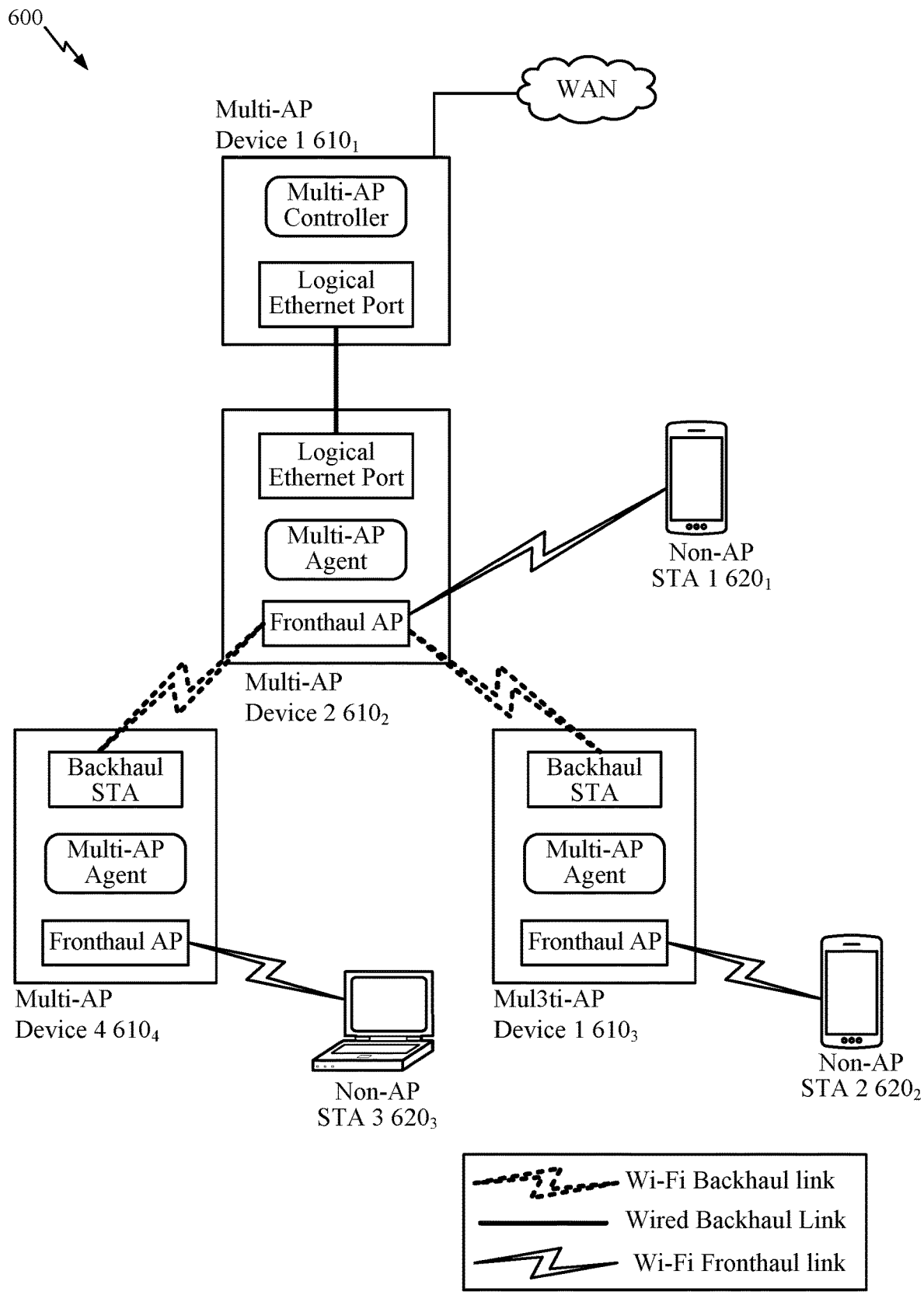
FIG. 6 illustrates a third example diagram of a multi access point (MAP) network, in accordance with certain aspects of the present disclosure.

FIG. 6 illustrates yet another example MAP network 600 in which MAP devices $610_2$, $610_3$, and $610_4$ route traffic to and from non-AP STAs $620_1$, $620_2$, and $620_3$. In this example, the MAP controller resides on a separate Multi-AP device $610_1$ which, in this case, may be connected to a WAN and may serve as a gateway device. In this example, MAP devices $610_{2-4}$ communicate directly with non AP STAs $620_{1-3}$ via a wireless fronthaul link. In this case, MAP device $610_2$ communicates with MAP devices $610_{3-4}$ via a wireless backhaul link, while MAP device $610_2$ communicates with MAP device $610_1$ via a wired backhaul link. In this arrangement, MAP device $610_2$ may obtain control information from MAP device $610_1$ and forward the control information to MAP devices $610_{3-4}$.

As illustrated in the various examples shown in FIGS. 4, 5 and 6, through various wired and/or wireless fronthaul and backhaul connections via various MAP agents, the MAP network may serve to route traffic to and from various non-AP STAs. For example, the MAP agents may be configured to forward uplink and/or downlink traffic in accordance with the traffic separation policy information received from the controller. In some cases, the actual topology for a MAP network may depend on capabilities of the agents in the MAP network. For example, a MAP controller may arrange the topology in such a way that traffic for all VIDs downstream of an Agent can be forwarded by that Agent.

A single Multi-AP (MAP) Network can support multiple SSIDs. The administrator of a MAP network can use these different SSIDs to provide different network accesses for clients, such as owner's network access, guest network access, and public network access.

Aspects of the present disclosure provide a mechanism for separating traffic from different networks supported in a MAP network. For example, aspects of the present disclosure provide a mechanism (protocol) to allow the controller to configure MAP agents so that MAP agents can perform traffic separation.

Figure 7:
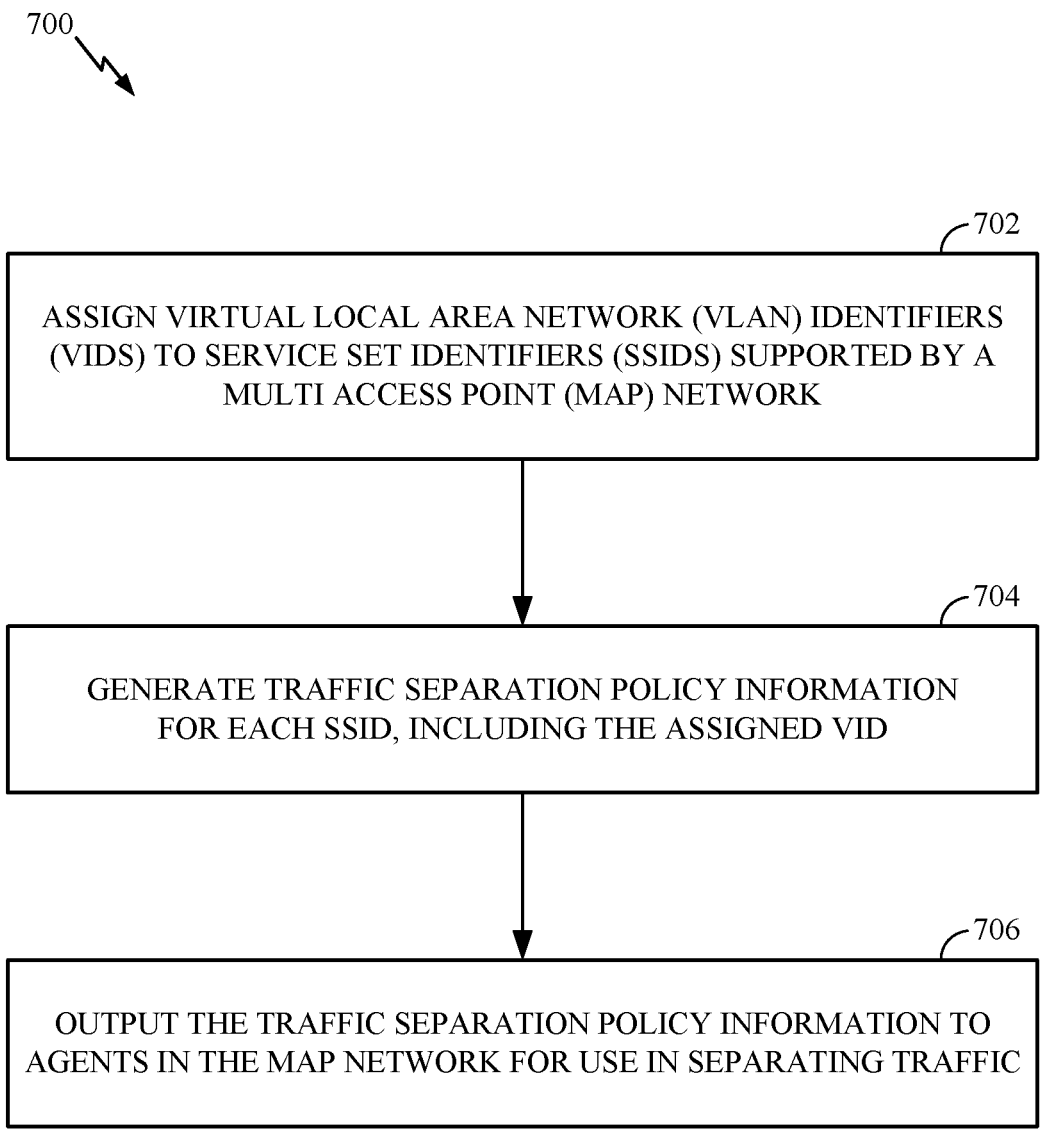
FIG. 7 is a flow diagram of example operations for wireless communication, in accordance with certain aspects of the present disclosure.
Figure 7A:
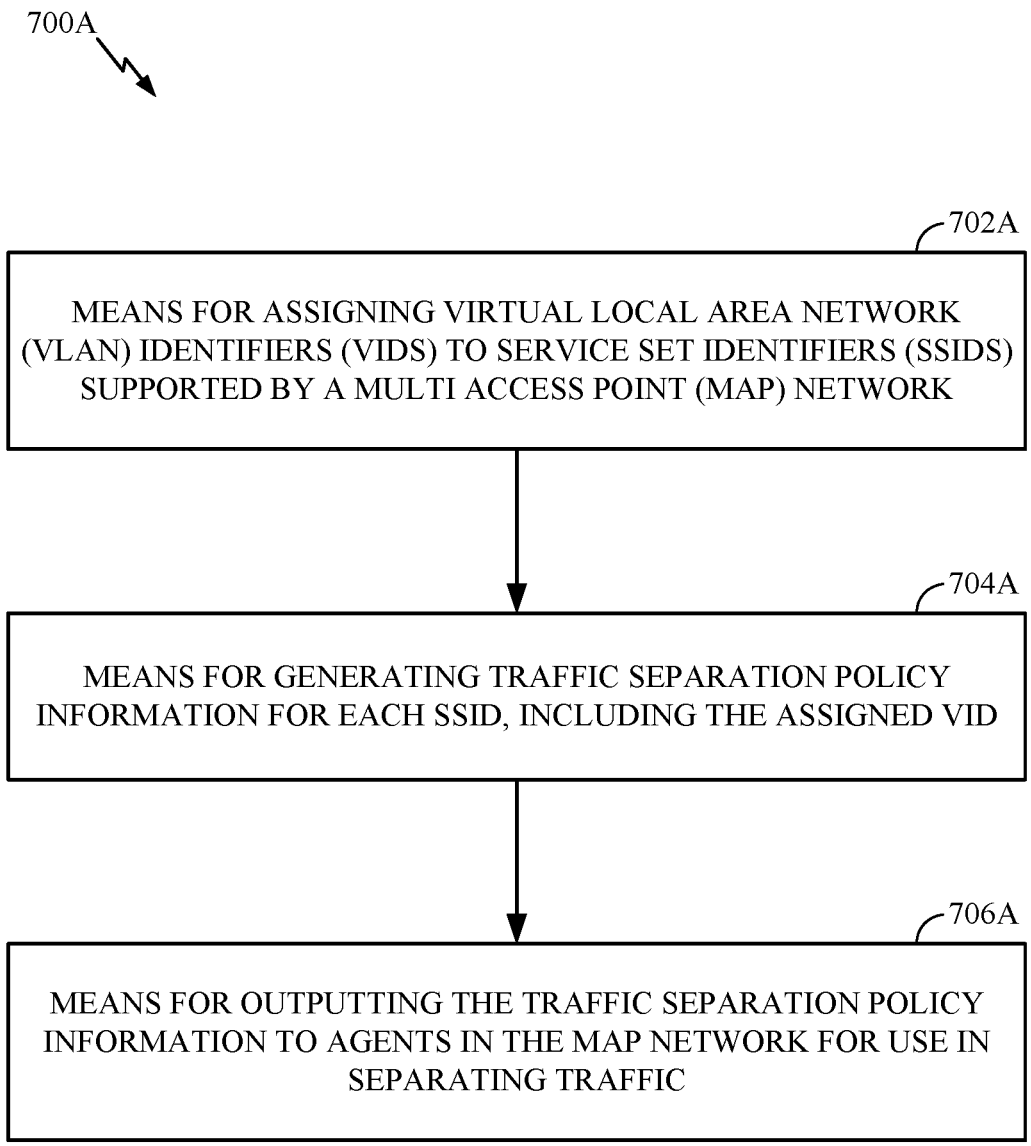
FIG. 7A illustrates example components capable of performing the operations shown in FIG. 7, in accordance with certain aspects of the present disclosure.

FIG. 7 illustrates example operations 700 for wireless communications by an apparatus, in accordance with aspects of the present disclosure. For example, operations 700 may be performed by a controller (any device acting as a controller function) of a MAP network, such as any of the MAP devices ($410_1$, $510_1$ or $610_1$) shown in FIGS. 4-6 with a resident controller.

Operations 700 begin, at 702, by assigning virtual local area network (VLAN) identifiers (VIDs) to service set identifiers (SSIDs) supported by a multi access point (MAP) network. At 704, the apparatus generates traffic separation policy information for each SSID, including the assigned VID.

At 706, the apparatus outputs the traffic separation policy information to agents in the MAP network for use in separating traffic. For example, the traffic separation policy information may be output for transmission via a type length value (TLV) field. The TLV filed may be included in a message, such as a MAP policy configuration request message or a Wi-Fi simple configuration (WSC) message.

In this manner, the MAP Controller may configure sets of (one or more) SSIDs to a single VLAN ID in a Traffic Separation Policy (e.g., each mapping from one or many SSIDs to one VLAN ID may be indicated in a Traffic Separation Policy TLV such as shown in FIG. 10). As shown in FIG. 4, a MAP Controller may distribute the Traffic Separation Policy information to the MAP Agents.

Figure 8:
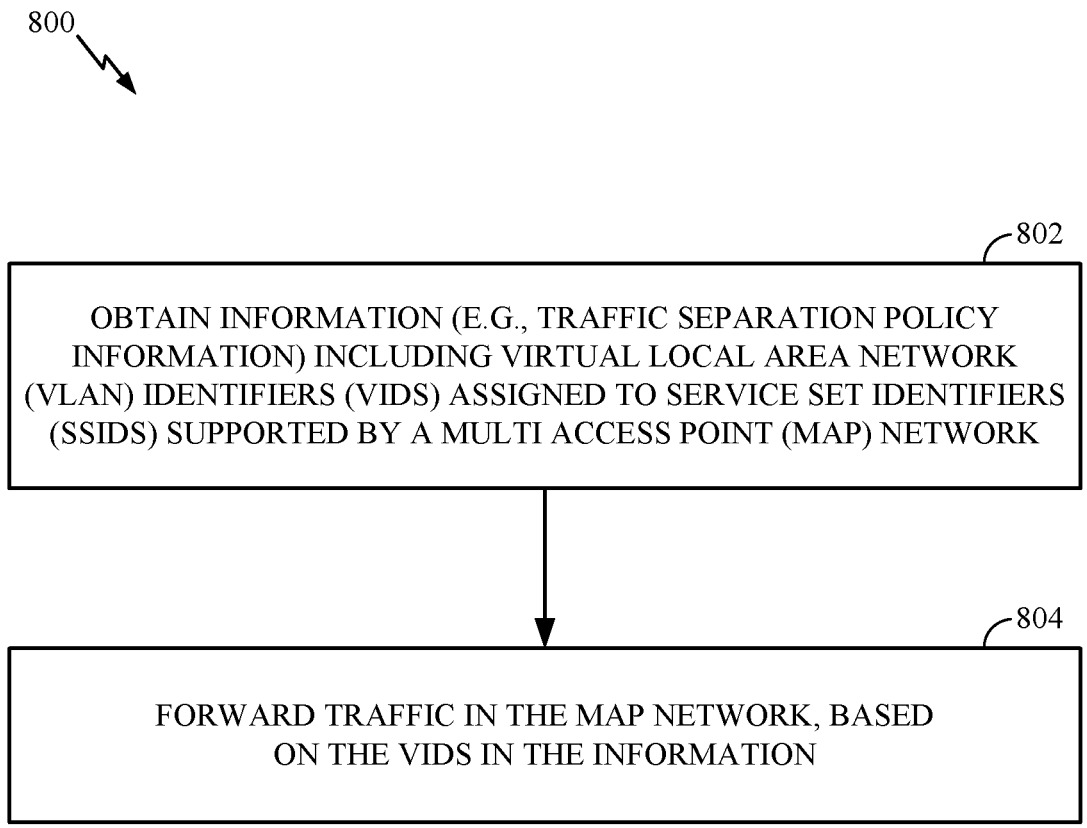
FIG. 8 is a flow diagram of example operations for wireless communication, in accordance with certain aspects of the present disclosure.
Figure 8A:
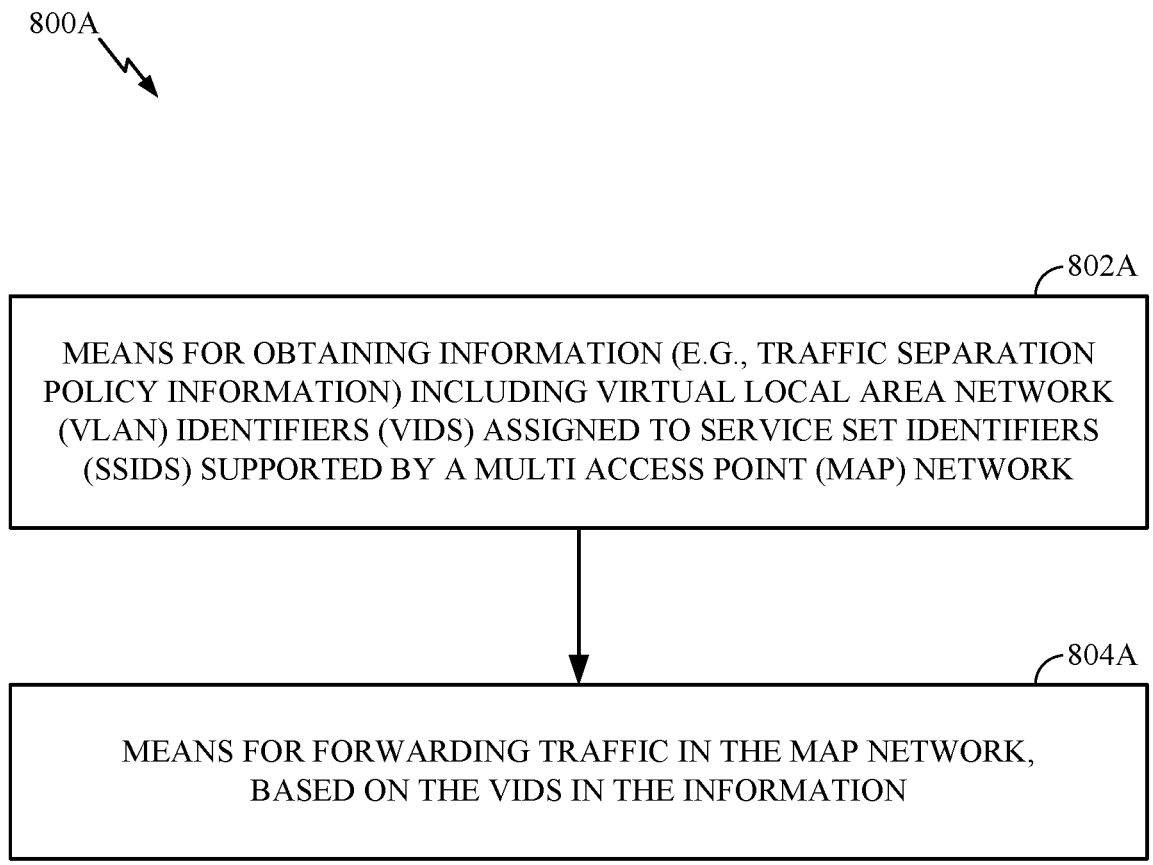
FIG. 8A illustrates example components capable of performing the operations shown in FIG. 8, in accordance with certain aspects of the present disclosure.

FIG. 8 is a flow diagram of example operations 800 for wireless communication by an apparatus, in accordance with certain aspects of the present disclosure. Operations 800 may be performed, for example, by a MAP agent receiving traffic separation information from a MAP controller, such as any of the MAP devices shown in FIGS. 4-6 with a resident MAP agent.

The operations 800 begin, at 802, by obtaining information (e.g., traffic separation policy information) including virtual local area network (VLAN) identifiers (VIDs) assigned to service set identifiers (SSIDs) supported by a multi access point (MAP) network. At 804, the apparatus forwards traffic in the MAP network, based on the VIDs in the information.

As noted above, the traffic separation policy information may be output for transmission via a TLV field. In some cases, the traffic separation policy information may include a bitmap that indicates how traffic for certain SSIDs is to be filtered. For example, network resource accessibility bitmaps may indicate how traffic for corresponding SSIDs are to be treated. In some cases, a resource accessibility bitmap may indicate traffic for a corresponding SSID is to only be forwarded between a gateway and an agent.

Figure 9:
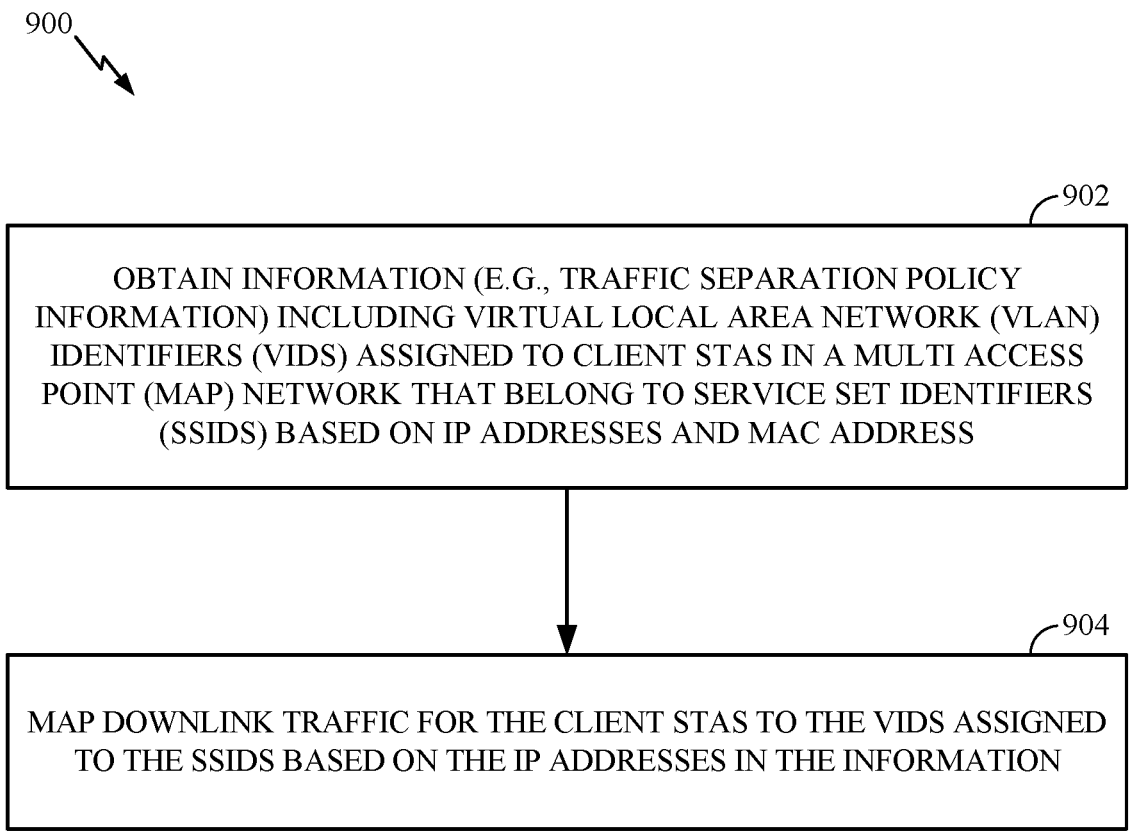
FIG. 9 is a flow diagram of example operations for wireless communication, in accordance with certain aspects of the present disclosure.

FIG. 9 is a flow diagram of example operations 800 for wireless communication by an apparatus, in accordance with certain aspects of the present disclosure. Operations 900 may be performed, for example, by a gateway device (e.g., MAP device $510_1$ of FIG. 5 or $610_1$ of FIG. 6).

The operations 900 begin, at 902, by obtaining information (e.g., traffic separation policy information) including virtual local area network (VLAN) identifiers (VIDs) assigned to client STAs in a multi access point (MAP) network that belong to service set identifiers (SSIDs) based on IP addresses and MAC address.

At 904, the apparatus maps downlink traffic for the client STAs to the VIDs assigned to the SSIDs based on the IP addresses in the information. As noted above, the traffic separation policy information may be output for transmission via a TLV field.

As noted above, a MAP network can support multiple SSIDs, which can help support traffic separation to provide different network accesses for clients, such as owner's network, guest network, and public network.

When configured by the Controller to enable multiple SSIDs, a MAP agent may enable multiple SSIDs on its Fronthaul BSSs and may use different BSSs for different SSIDs. In this case, a MAP Agent may provide a Backhaul SSID for a downstream Agent to join the backhaul.

With the traffic separation technique presented herein, traffic belonging to different SSIDs may be separated in a MAP network using virtual local area network (VLAN) identifiers (VIDs). In such cases, each SSID may be mapped to a unique VLAN VID. As described above, with reference to FIG. 7, the assignment of a VLAN VID to a SSID may be determined by a MAP Controller.

Traffic separation may be effectively implemented by configuring a MAP agent such that traffic belonging to one VID is not sent on a BSS belonging to a different VID. This can include broadcast traffic.

In some cases, the traffic forwarding between Agents may not be based on SSID-VLAN VID mapping. Rather, an Agent may be configured to forward traffic as an AP to a Backhaul-STA of its associated Agent or as a STA to the Fronthaul-AP of its associated Agent. When forwarding in this manner, the Agent may maintain the VLAN VID of the incoming traffic.

In some cases, a STA acting as an ingress Agent may map uplink traffic from a non-Agent STA that is associated with a SSID to the VLAN VID that is assigned that SSID. An ingress agent generally refers to a device that is a first point of entry to a MAP network for a non-AP STA (e.g., MAP device $410_2$ of FIG. 4 may be considered an ingress Agent for non-AP STA $420_2$).

In some cases, an ingress Agent may add the VID to an ingress packet (e.g., an 802.1Q C-TAG with a VLAN ID) as specified in the Traffic Separation Policy. In such cases, an egress agent (forwarding a packet out of the MAP network) may remove the VLAN ID (e.g., remove the 802.1Q C-TAG with the VLAN ID). In this manner, the traffic belonging to each VLAN may be distinguished using the unique VLAN ID (e.g., in an 802.1Q C-TAG).

The Gateway (e.g., an agent that provides a gateway to a wide area network such as MAP device $510_1$ of FIG. 5 or $610_1$ of FIG. 6) may map the downlink traffic for an end client STA to the VLAN VID assigned to the SSID the end client STA joins based, on the STA's IP address in the MAP network (which may be provided in the traffic separation policy information).

FIG. 10 illustrates an example traffic separation policy TLV format. As noted above, in some cases, a Network Resource Accessibility bitmap in the SSID Traffic Separation Policy TLV (as illustrated in the second to last row of the example format shown in FIG. 10) for an SSID may indicate that the traffic is to be forwarded only between the Gateway and an Agent. In such cases, upon receiving a MAC service data unit (MSDU) of a VLAN VID that belongs to that SSID, the Agent should discard the MSDU, if neither the destination address nor the source address is the Gateway address.

Based on the SSID Traffic Separation configuration at the Controller, the Controller may be configured to send the traffic separation policy information of each SSID to Agents and to the Gateway, as shown in FIG. 4. The traffic separation policy information may be sent using SSID Traffic Separation Policy type length value (TLV), such as the example TLV format shown in FIG. 10. As noted above, such a TLV may be enclosed in the Multi-AP Policy Configuration Request message.

As described herein, SSID Traffic Separation Policy information for Agents of a MAP network may be directly based on SSID. In contrast, SSID Traffic Separation Policy information for the Gateway may be based on the IP addresses of the Agents and STAs associated with a SSID.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 9A:
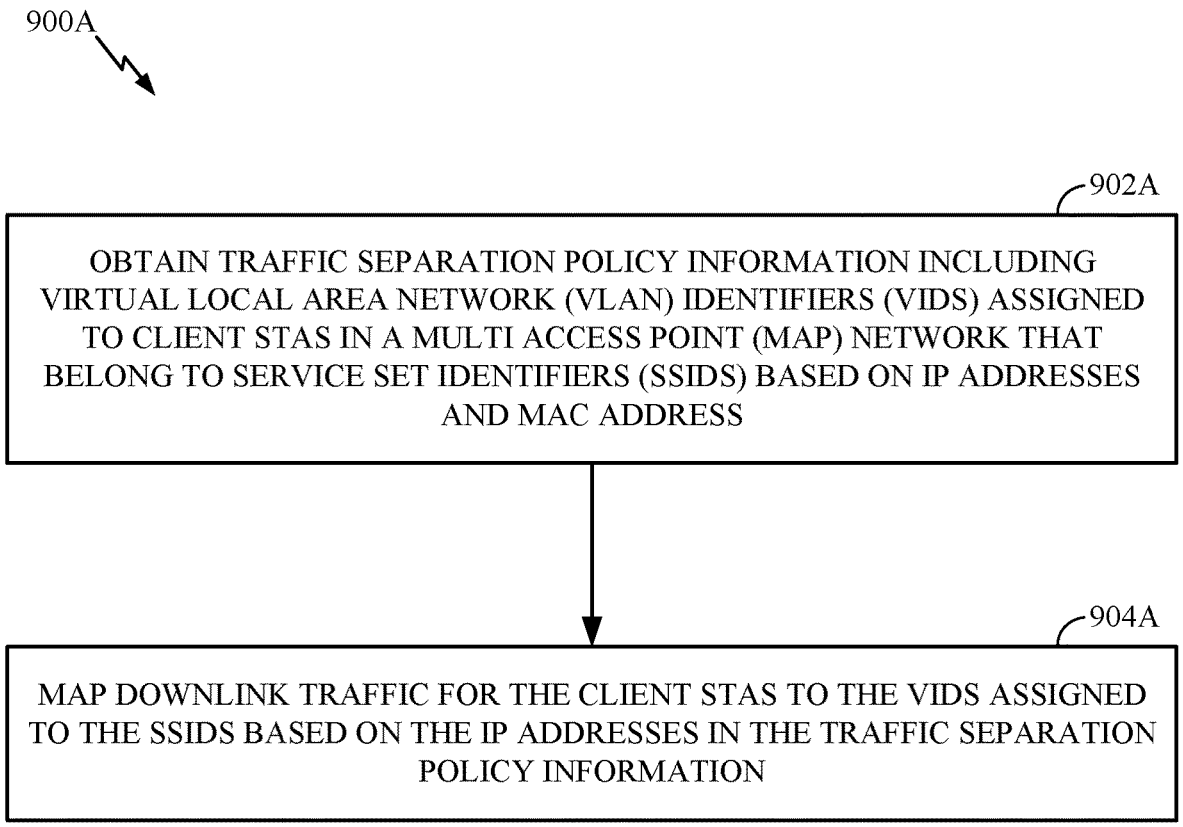
FIG. 9A illustrates example components capable of performing the operations shown in FIG. 9, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700, 800, and 900 illustrated in FIGS. 7, 8, and 9 correspond to means 700A, 800A, and 900A illustrated in FIGS. 7A, 8A, and 9A, respectively.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 252 of the station 120 illustrated in FIG. 2. Means for processing, means for extracting, means for performing channel estimation, means for demultiplexing, means for obtaining, means for generating, means for selecting, means for decoding, means for deciding, means for demultiplexing, means for discarding, means for forwarding, means for mapping, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
assign virtual local area network (VLAN) identifiers (VIDs) to at least some of service set identifiers (SSIDs) supported by a multi access point (MAP) network, and
generate traffic separation policy information for each of the SSID; and
at least one interface configured to output the traffic separation policy information, wherein the traffic separation policy information is output for transmission via a type length value (TLV) that includes at least one octet for type, two octets for length, and one or more octets indicating SSIDs, wherein the TLV is enclosed in a MAP Policy Configuration Request message.

2. The apparatus of claim 1, wherein the TLV indicates whether the traffic separation policy information is one or more of SSID based, internet protocol (IP) address based, or media access control (MAC) address based.

3. The apparatus of claim 2, wherein:
the TLV also includes an indication of the VID assigned to one of the SSIDs; and
if the TLV indicates the traffic separation policy information is SSID based or internet protocol (IP) address, the TLV also indicates one or more IP addresses associated with the SSID to which the indicated VID is assigned.

4. The apparatus of claim 1, wherein the traffic separation policy information comprises a bitmap that indicates how traffic for a corresponding SSID is to be handled.

5. The apparatus of claim 1, wherein the bitmap indicates whether or not traffic for the corresponding SSID is to only be forwarded between a gateway and an agent.

6. An apparatus for wireless communications, comprising:
at least one interface configured to
obtain information including virtual local area network (VLAN) identifiers (VIDs) assigned to service set identifiers (SSIDs) supported by a multi access point (MAP) network and to obtain traffic, wherein the information is obtained via a type length value (TLV) that includes at least one octet for type, two octets for length, and one or more octets indicating SSIDs; and
a processing system configured to: forward the traffic in the MAP network, based on the VIDs in the information, and add a VLAN ID to a packet obtained from a device for which the apparatus is a first point of entry to the MAP network.

7. The apparatus of claim 6, wherein:
the at least one interface is configured to obtain a message; and
the TLV is enclosed in the message.

8. The apparatus of claim 6, wherein the TLV indicates whether the information is one or more of SSID based, internet protocol (IP) address based, or media access control (MAC) address based.

9. The apparatus of claim 8, wherein:
the TLV also includes an indication of the VID assigned to one of the SSIDs; and
if the TLV indicates the information is SSID based or internet protocol (IP) address, the TLV also indicates one or more IP addresses associated with the SSID to which the indicated VID is assigned.

10. The apparatus of claim 6, wherein the information comprises a bitmap that indicates how traffic for a corresponding SSID is to be handled.

11. The apparatus of claim 10, wherein the bitmap indicates whether or not traffic for the corresponding SSID is to only be forwarded between a gateway and an agent.

12. The apparatus of claim 11, wherein
the processing system is configured to discard the traffic for an SSID if the bitmap corresponding to that SSID indicates the traffic is to only be forwarded between a gateway and an agent.

13. An apparatus for wireless communications, comprising:
at least one interface configured to obtain information including virtual local area network (VLAN) identifiers (VIDs) assigned to client STAs in a multi access point (MAP) network that belong to service set identifiers (SSIDs), wherein the VIDs are assigned to client STAs based on IP addresses and media access control (MAC) address, wherein the at least one interface is configured to obtain a message; and
a processing system configured to map downlink traffic for the client STAs to the VIDs assigned to the SSIDs based on the information, wherein the information is obtained via a type length value (TLV) that includes at least one octet for type, two octets for length, and one or more octets indicating SSIDs, wherein the TLV is enclosed in the message obtained by the at least one interface.

14. The apparatus of claim 13, wherein the TLV indicates whether information is one or more of SSID based, internet protocol (IP) address based, or media access control (MAC) address based.

15. The apparatus of claim 14, wherein:
the TLV also includes an indication of the VID assigned to one of the SSIDs; and
if the TLV indicates the information is SSID based or internet protocol (IP) address, the TLV also indicates one or more IP addresses associated with the SSID to which the indicated VID is assigned.

16. A method for wireless communications by an apparatus, comprising:
assigning information including virtual local area network (VLAN) identifiers (VIDs) to at least some of service set identifiers (SSIDs) supported by a multi access point (MAP) network;
generate traffic separation policy information for each of the SSIDs;
output the traffic separation policy, wherein the traffic separation policy information is output for transmission via a type length value (TLV) that includes at least one octet for type, two octets for length, and one or more octets indicating SSIDs,
wherein the TLV is enclosed in a MAP Policy Configuration Request message.

17. The method of claim 16, wherein the TLV indicates whether the information is one or more of SSID based, internet protocol (IP) address based, or media access control (MAC) address based.

18. The method of claim 17, wherein:
the TLV also includes an indication of the VID assigned to one of the SSIDs; and
if the TLV indicates the information is SSID based or internet protocol (IP) address, the TLV also indicates one or more IP addresses associated with the SSID to which the indicated VID is assigned.

19. The method of claim 16, wherein the information comprises a bitmap that indicates how traffic for a corresponding SSID is to be handled.

20. The method of claim 19, wherein the bitmap indicates whether or not traffic for the corresponding SSID is to only be forwarded between a gateway and an agent.

21. The method of claim 20, comprising:
discarding the traffic for an SSID if the bitmap corresponding to that SSID indicates the traffic is to only be forwarded between a gateway and an agent.

22. A method for wireless communications by an apparatus, comprising:
obtaining information including virtual local area network (VLAN) identifiers (VIDs) assigned to service set identifiers (SSIDs) supported by a multi access point (MAP) network;
obtaining traffic;
forwarding the traffic in the MAP network, based on the VIDs in the information, wherein the information is obtained via a type length value (TLV) that includes at least one octet for type, two octets for length, and one or more octets indicating SSIDs; and
adding a VLAN ID to a packet obtained from a device for which the apparatus is a first point of entry to the MAP network.

23. A method for wireless communications by an apparatus, comprising:
obtaining information including virtual local area network (VLAN) identifiers (VIDs) assigned to client STAs in a multi access point (MAP) network that belong to service set identifiers (SSIDs), wherein the VIDs are assigned to client STAs based on IP addresses and media access control (MAC) address;
obtaining a message; and
mapping downlink traffic for the client STAs to the VIDs assigned to the SSIDs based on the information, wherein the information is obtained via a type length value (TLV) that includes at least one octet for type, two octets for length, and one or more octets indicating SSIDs, wherein the TLV is enclosed in the message.

* * * * *